(12) United States Patent
Yoder

(10) Patent No.: US 8,534,961 B1
(45) Date of Patent: Sep. 17, 2013

(54) MATERIAL BLOWER

(76) Inventor: Joseph A. Yoder, Lewisburg, PA (US)

(\*) Notice: Subject to any disclaimer, the term of this patent is extended or adjusted under 35 U.S.C. 154(b) by 457 days.

(21) Appl. No.: 12/850,997

(22) Filed: Aug. 5, 2010

Related U.S. Application Data

(60) Provisional application No. 61/231,985, filed on Aug. 6, 2009.

(51) Int. Cl.
*B65G 53/48* (2006.01)

(52) U.S. Cl.
USPC .............. 406/53; 406/135; 406/144; 406/146

(58) Field of Classification Search
USPC ................ 406/53, 55, 135, 144, 146; 366/10
See application file for complete search history.

(56) References Cited

U.S. PATENT DOCUMENTS

| | | | | |
|---|---|---|---|---|
| 4,440,499 A | * | 4/1984 | Tomikawa et al. | 366/3 |
| 4,630,929 A | * | 12/1986 | Medlin | 366/10 |
| 4,896,968 A | * | 1/1990 | Baillie | 366/10 |
| 5,184,892 A | * | 2/1993 | Hafner | 366/10 |
| 5,570,953 A | * | 11/1996 | DeWall | 366/10 |
| 7,413,388 B2 | * | 8/2008 | Krebs | 406/55 |
| 7,766,537 B2 | * | 8/2010 | Gembala | 366/10 |
| 2003/0142579 A1 | * | 7/2003 | Throop | 366/3 |

\* cited by examiner

*Primary Examiner* — Joseph A Dillon, Jr.
(74) *Attorney, Agent, or Firm* — John J. Elnitski, Jr.

(57) ABSTRACT

A material blower for blowing materials that includes a base; a material container to hold the materials mounted to the base that is sealed to be pressurized; at least one loading opening in the top of the material container the includes a door to cover and seal the at least one loading opening; a material output chute as part of the bottom of the material container to receive material for distribution; a material exit at one end of the material output chute, the material exit including a distribution hose opening and an air blower connection; at least one anti-clumping bars that rotate inside the material container; an auger within and along the material output chute an air blower connected to the material container, the air blower connected to the material exit; a distribution hose; a power unit connected to the auger, the anti-clumping bars and the air blower.

20 Claims, 16 Drawing Sheets

MATERIAL BLOWER

This application claims the benefit of and incorporates by reference U.S. Provisional Application No. 61231985 filed Aug. 6, 2009.

BACKGROUND

The present invention generally relates material blowers. More specifically, the present invention relates portable material blowers used in landscaping.

Most material blowers used today are for unloading large trailers of food material such as flour and sugar. Food materials are less susceptible to clumping during unloading due to the nature of the acceptable condition of the food materials when they are delivered. Landscaping materials that are blown into position from a vehicle are prone to clumping due to allowable moisture content, as compared to food materials and plastics. Clumping occurs due to storage techniques of the material and how long the material is stored in the delivery vehicles. Current landscaping material blowers on the market have yet to solve the problems associated with clumping materials that are to be air blown during delivery, they are expensive and are very complicated machines.

It is an object of the present invention to provide an apparatus which prevents clumping of materials prior to being air blown during delivery.

SUMMARY OF THE INVENTION

A material blower for blowing materials that includes a base; a material container to hold the materials mounted to the base that is sealed to be pressurized; at least one loading opening in the top of the material container the includes a door to cover and seal the at least one loading opening; a material output chute as part of the bottom of the material container to receive material for distribution; a material exit at one end of the material output chute, the material exit including a distribution hose opening and an air blower connection; at least one anti-clumping bars that rotate inside the material container; an auger within and along the material output chute an air blower connected to the material container, the air blower connected to the material exit; a distribution hose; a power unit connected to the auger, the anti-clumping bars and the air blower.

BRIEF DESCRIPTION OF DRAWINGS

FIG. 6 is a perspective view of a material blower according to the present invention.

DETAILED DESCRIPTION

Figure 1:
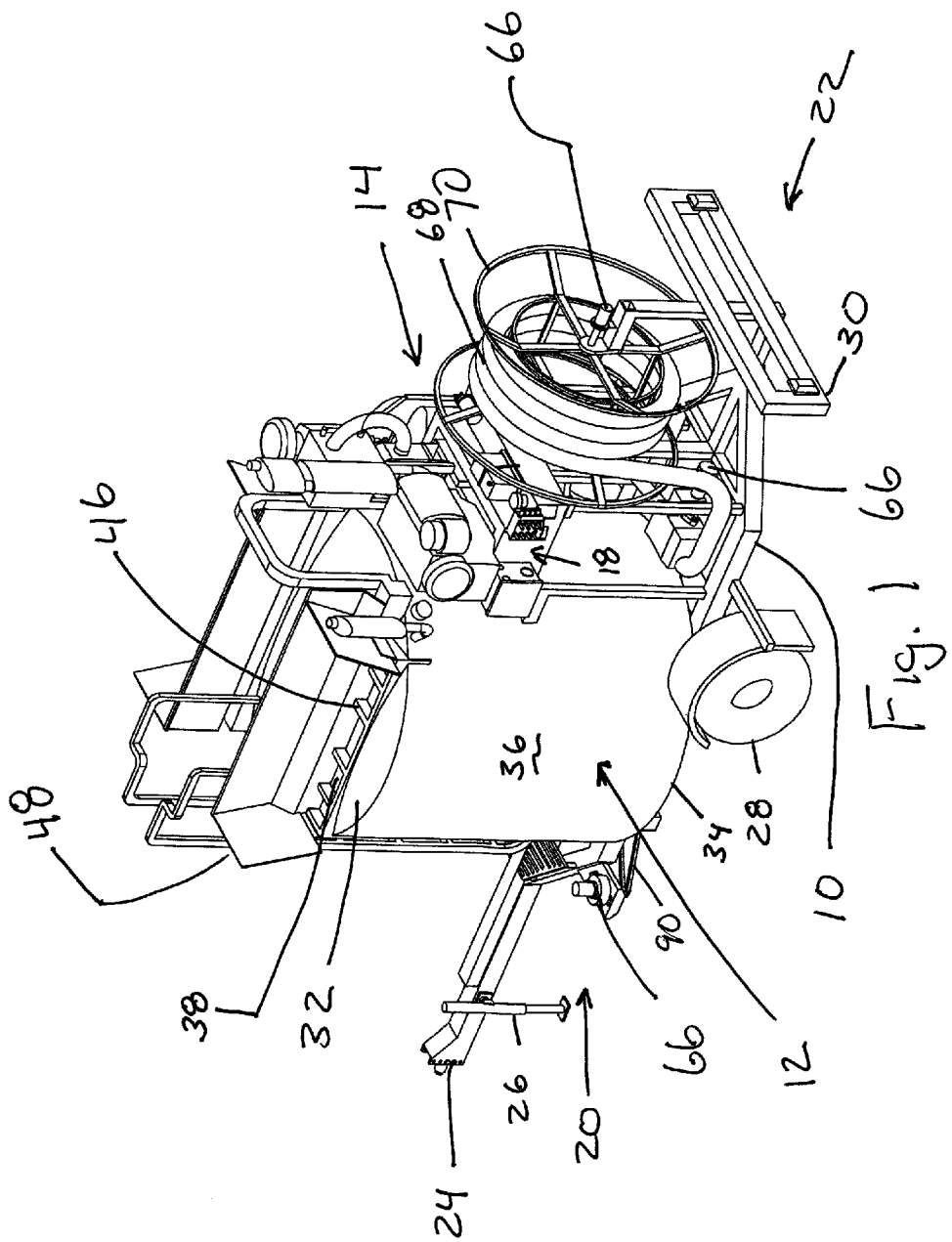
FIG. 1 is a perspective view of a material blower according to the present invention.

The present invention is a material blower, as shown in FIGS. 1-16. The main components of the material blower are a trailer 10, material container 12, power unit 14, power control unit 16 and dispensing unit 18, as shown in FIGS. 1-4. The material blower is used to dispense material such as mulch and soil for landscaping purposes.

The trailer 10 acts as a base and is used to move the material blower from job site to job site, as shown in FIGS. 1-6. It is of a metal frame work having a front end 20 and a rear end 22. The front end 20 of the trailer includes a hitch 24 for attachment to a vehicle. The front end 20 also includes a jack 26 to support the front of the trailer 10 when the trailer 10 is not attached to a vehicle. Two wheels 28 with tires are attached to the metal frame work. The rear end 22 of the trailer includes a rear bumper 30.

Figure 2:
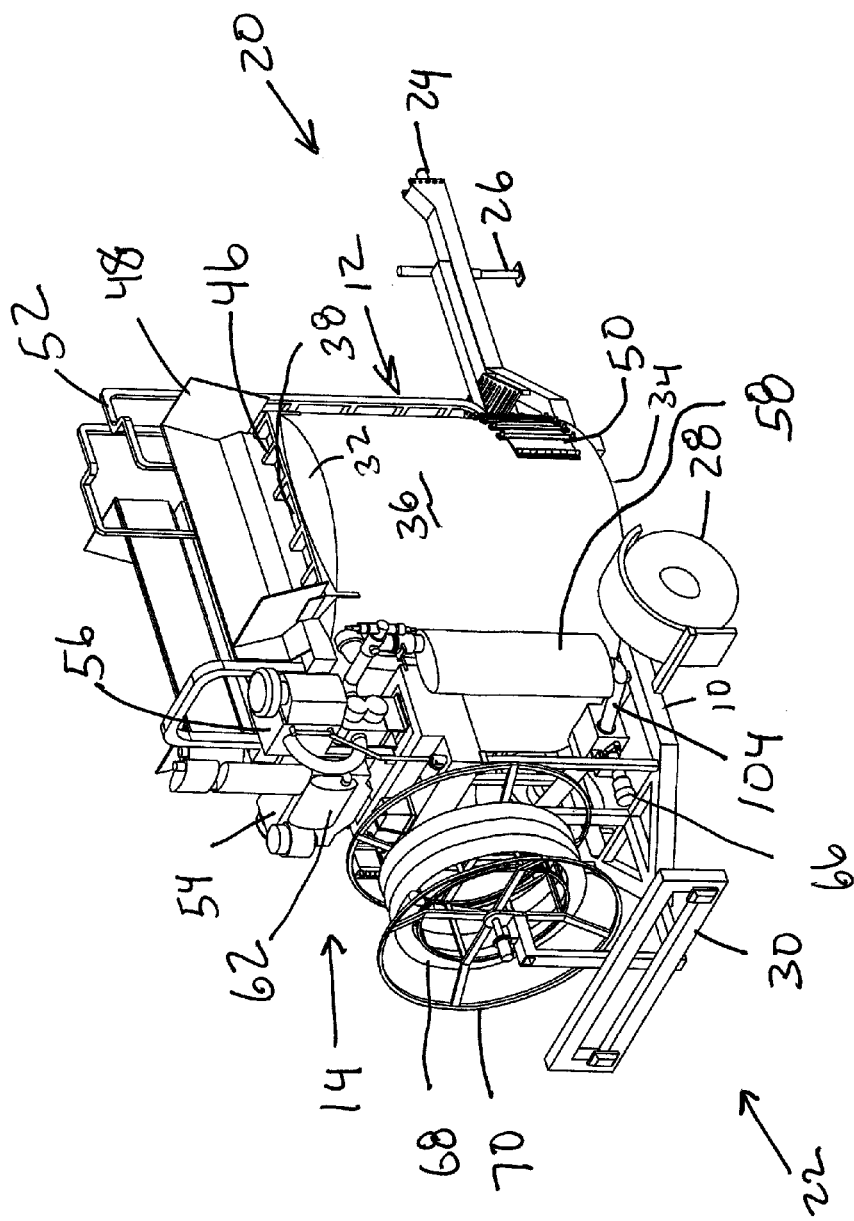
FIG. 2 is a perspective view of a material blower according to the present invention.
Figure 3:
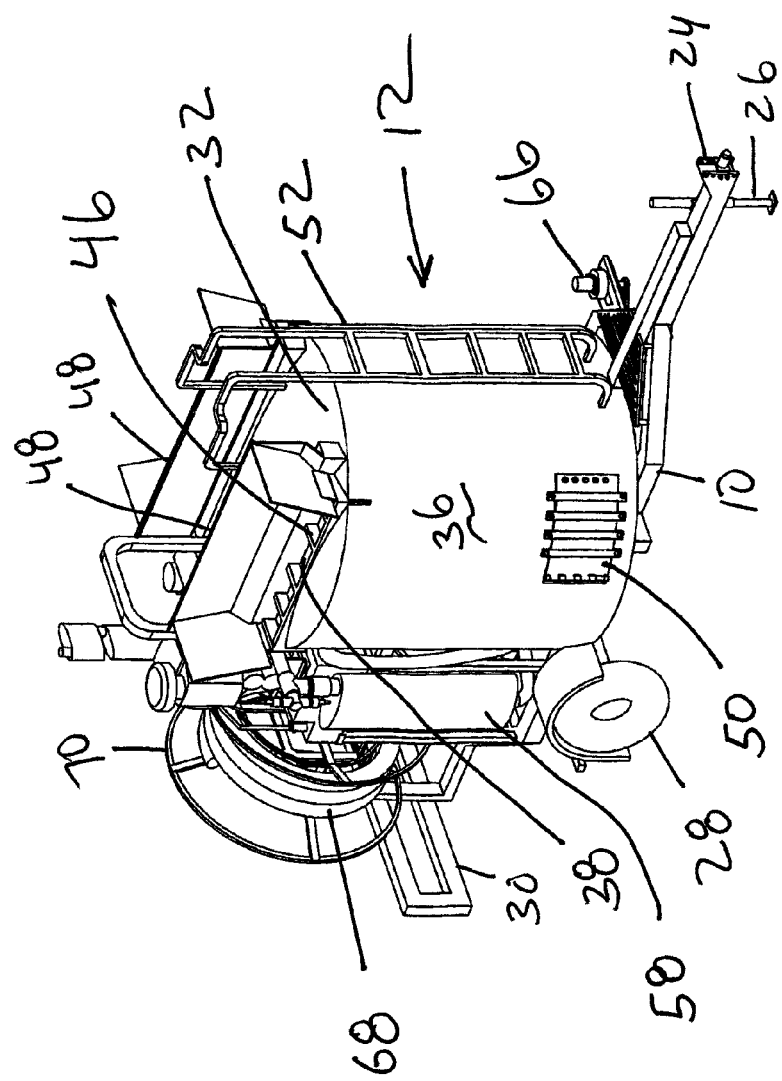
FIG. 3 is a perspective view of a material blower according to the present invention.
Figure 4:
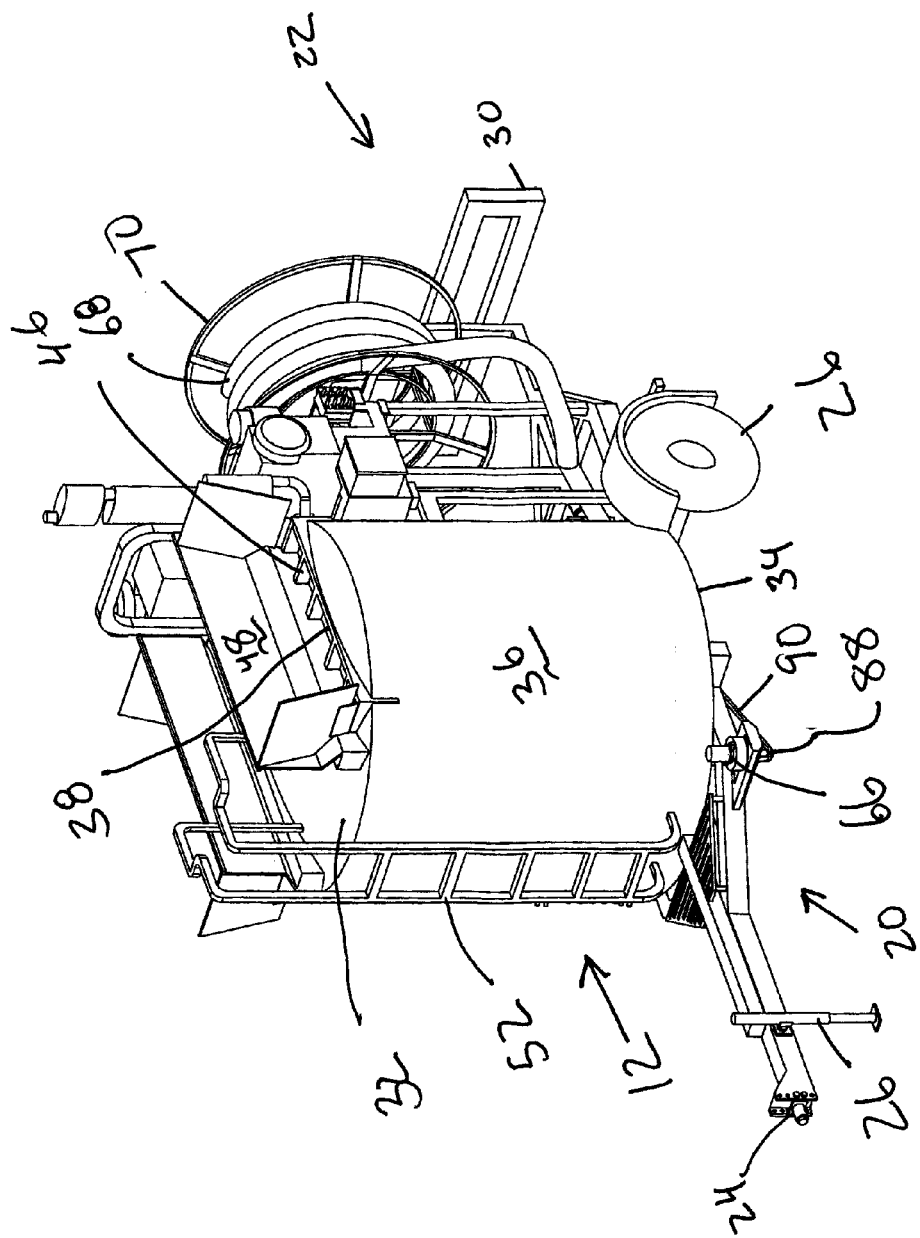
FIG. 4 is a perspective view of a material blower according to the present invention.
Figure 5:
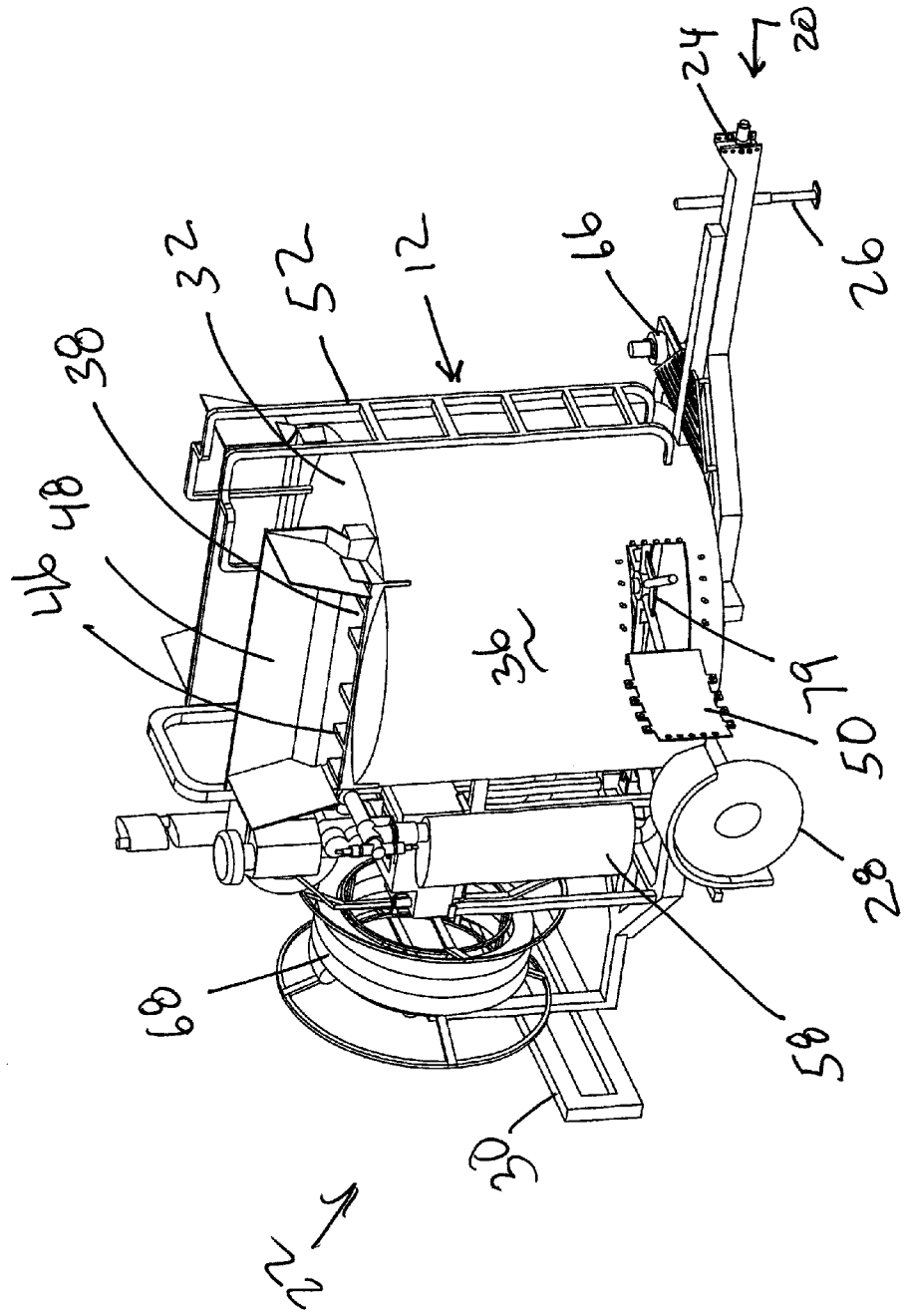
FIG. 5 is a perspective view of a material blower according to the present invention.
Figure 9:
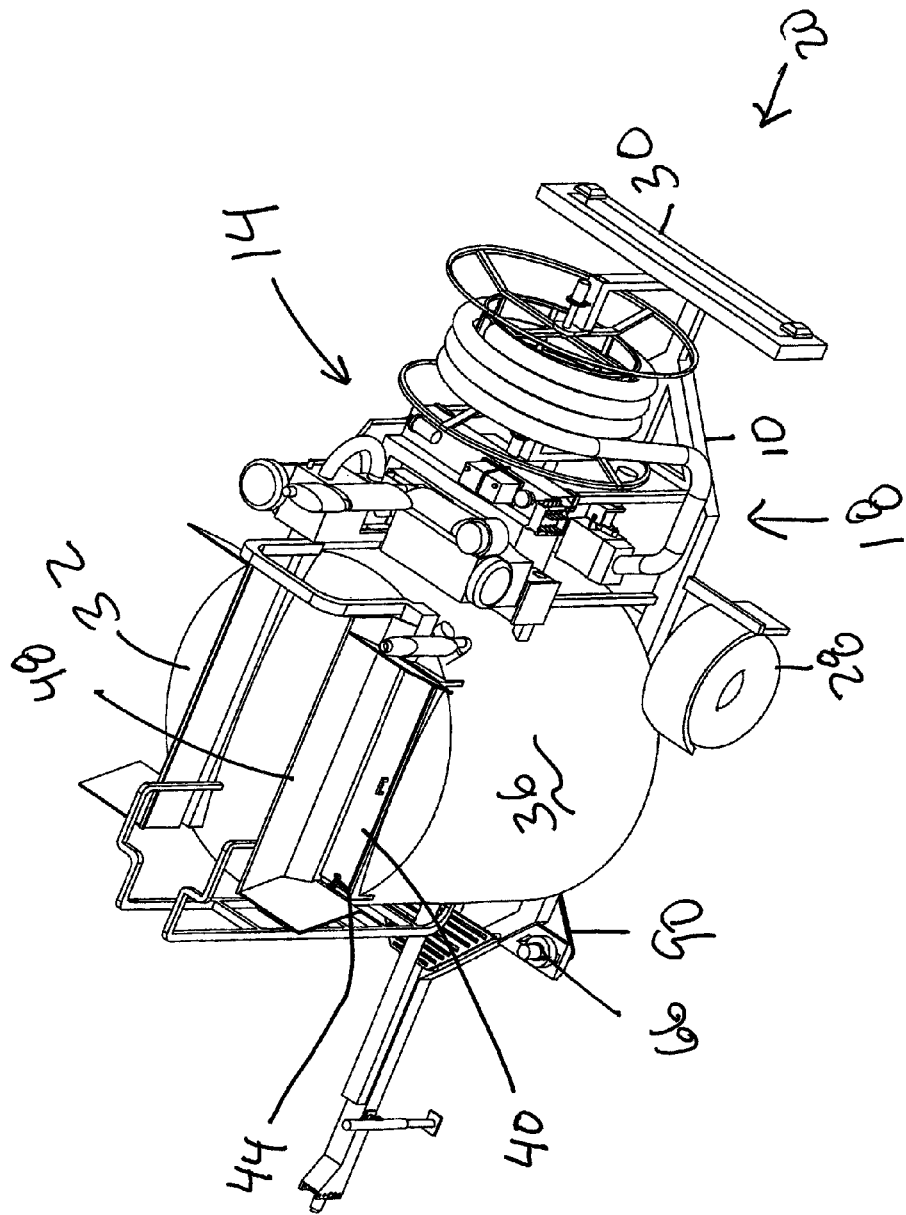
FIG. 9 is a exploded perspective view of a material blower according to the present invention.
Figure 7:
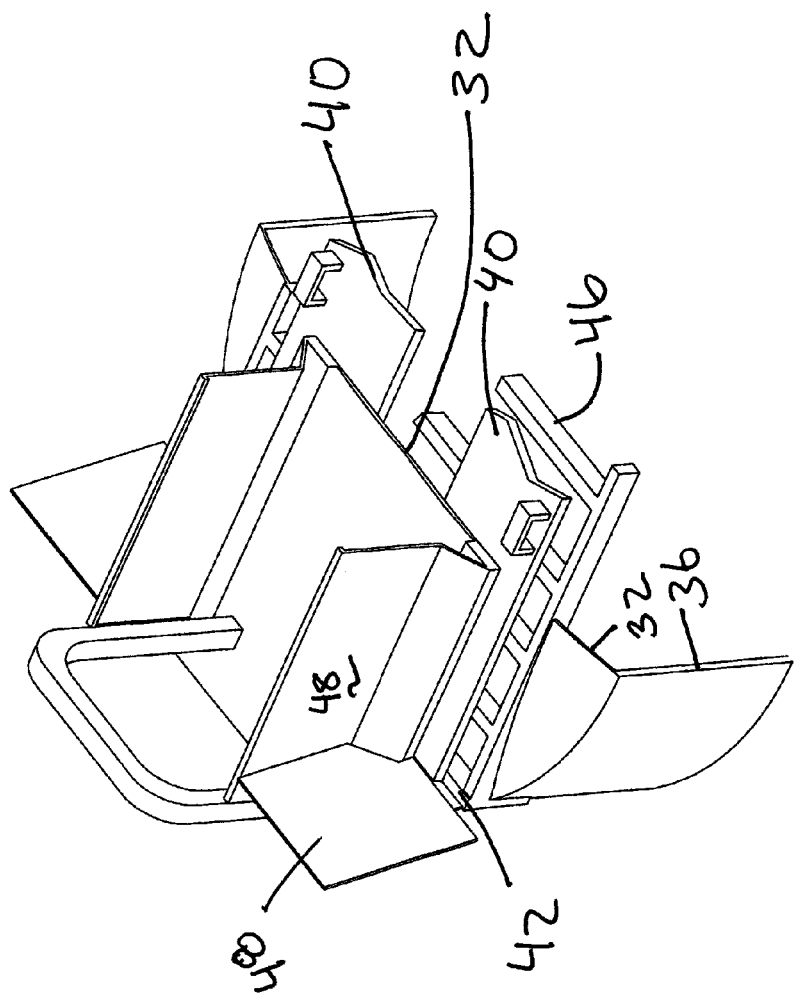
FIG. 7 is a cutaway perspective view of a material blower according to the present invention.
Figure 10:
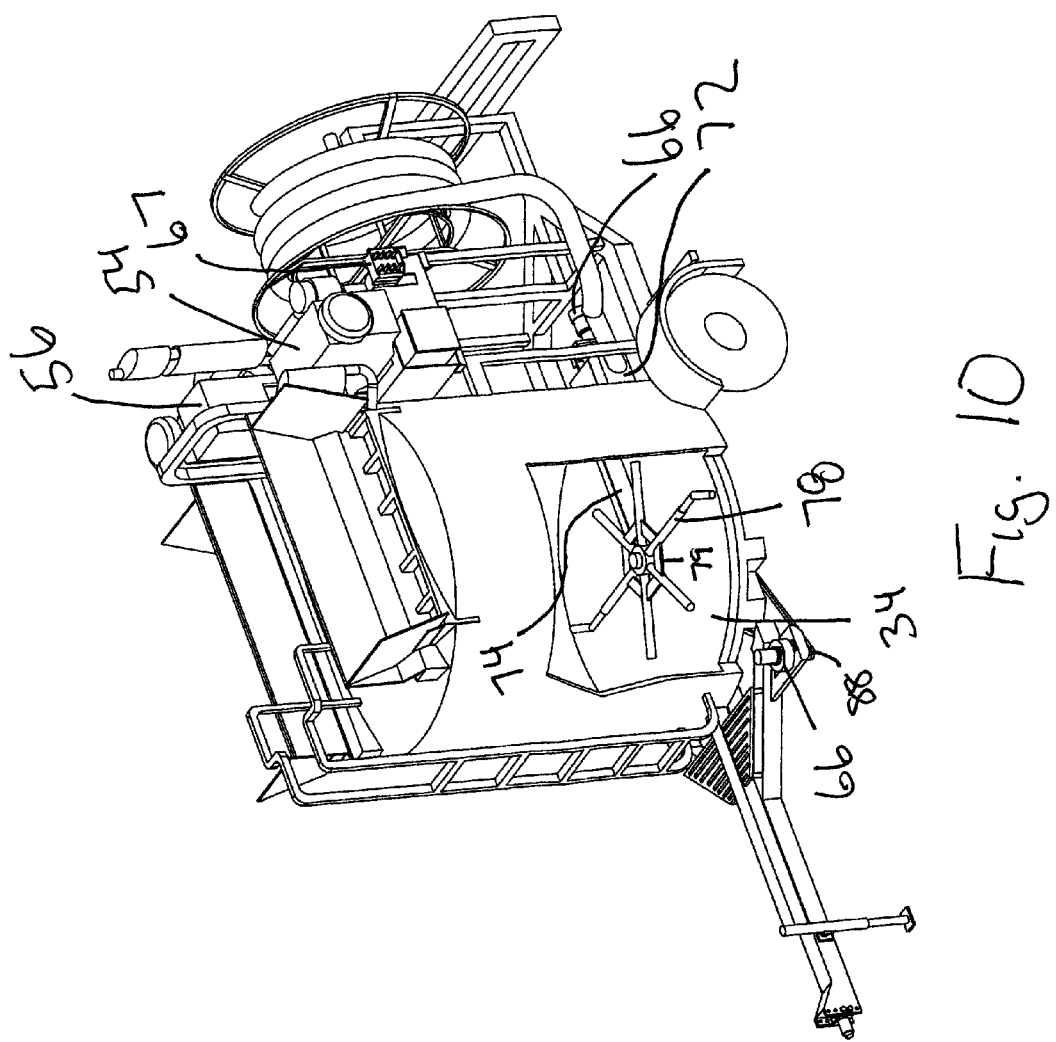
FIG. 10 is a cutaway perspective view of a material blower according to the present invention.

The material container 12 is shown as a large cylindrical tank shape, as shown in FIGS. 1-10. The material container 12 includes a top 32, bottom 34 and container wall 36 between the top 32 and bottom 34, as shown in FIG. 10. The top 32, bottom 34 and container wall 36 form an airtight sealed container. The bottom 34 of the material container 12 is attached to the trailer 10. The top 32 includes two loading openings 38, as shown in FIGS. 1-5. Each of the loading openings 38 includes a sliding door 40. The sliding door 40 provides an airtight seal when used to close the loading openings 38, as shown in FIGS. 6-7. The sliding doors 40 slide between the top 32 of the material container and the edges 42 of the loading openings 38. When the sliding doors 40 are slid shut, a seal is formed between the sliding doors 40 and the edges 42 of the loading openings 38. FIGS. 6 and 17 show pressure latches 44 which hold the sliding door 40 in place. The pressure latches 44 force the sliding door 40 against the edges 42 of the loading openings 38 to form the airtight seal at the loading openings 38. Each of the loading openings 38 includes break up bars 46 within the loading openings 38. The break up bars 46 cause the material loaded into the loading opening 38 to broken up, as the material is dumped into the loading opening 38 and hits the break up bars 46. This avoids clumping of the material, as the material is loaded. Loading shields 48 surround three sides of the loading opening 38 to funnel the material into the loading opening 38 and prevent spillage during loading of the material. The material container 12 includes a lower access door 50, as shown in FIGS. 2 and 5. The lower access door 50 provides access to the material container 12 near the bottom 34 of the material container 12 along the container wall 36 of the material container 12. The lower access door 50 is bolted to the material container 12 to provide an air tight seal when in the closed position. Container framework 52 forms a ladder and safety rails that are mounted to the front and top 32 of the material container 12, as shown in FIGS. 1-6. There is also a safety rail as part of the framework 52 attached to the top 32 of the material container near the rear of the material container 12.

The power unit 14 drives the movable components of the material blower. The power unit 14 includes a power source 54, an air blower 56, hydraulics and air muffler 58, as shown in FIG. 9. The power source 54 can be any device that will operate the other parts of the power unit 14. The power source 54 can be electric motor or fossil fuel engine. A typical self contained power source 54 is a diesel engine and is what is shown as the power source 54, but the power source 54 could be any type that operates similar to a diesel engine in order to drive the other components of the power unit 14. A battery 60 is shown in FIG. 9 which provides the electrical power to start the diesel engine. The air blower 56 is similar to commercially known dry tank blowers on the market, as it is to be used to blow dry material. Dry materials to be blown do not have to be 100% dry, just that the materials are not in a liquid state. The air blower is driven by the power source 54. The air blower 56 can be directly connected to crank shaft of the engine or connected to a transmission device that interconnects the air blower 56 to the engine. The transmission device can be as simple as belt between two pulleys, where one pulley is connected to the crankshaft of the engine and the other pulley is connected to the air blower. The hydraulics of the power unit 14 is shown as a hydraulic pump 62 and hydraulic hoses 64 to power hydraulic motors 66 that are used to turn components of the dispensing unit 18. The hydraulic pump 62 is connected to power source 54, such that the power source 54 drives the hydraulic pump 62. The hydraulic pump 62 can be directly connected to crank shaft of the engine or a transmission device can be used to interconnect the hydraulic pump 62 to the engine. The hydraulic pump 62 provides hydraulic fluid to the hydraulic motors 66. The hydraulic motors 64 are used to operate different components for the distribution of the materials from the material container 12.

The material blower includes a series of hydraulic valves and electrical control box 67 which act together as the power control unit 16. The electrical control box provides the control to start and stop the power source 54. In the case shown in FIGS. 9 and 18, the electrical control box 67 is the interface between the battery 60 and the power source 54. The electrical control box 67 is also used to control the hydraulic valves. The hydraulic valves control the flow of the hydraulic fluid between the hydraulic pump 62 and the hydraulic motors 64. Whereby, the hydraulic motors 64 operate when hydraulic fluid is allowed to be pumped through the hydraulic motors 64.

Figure 11:
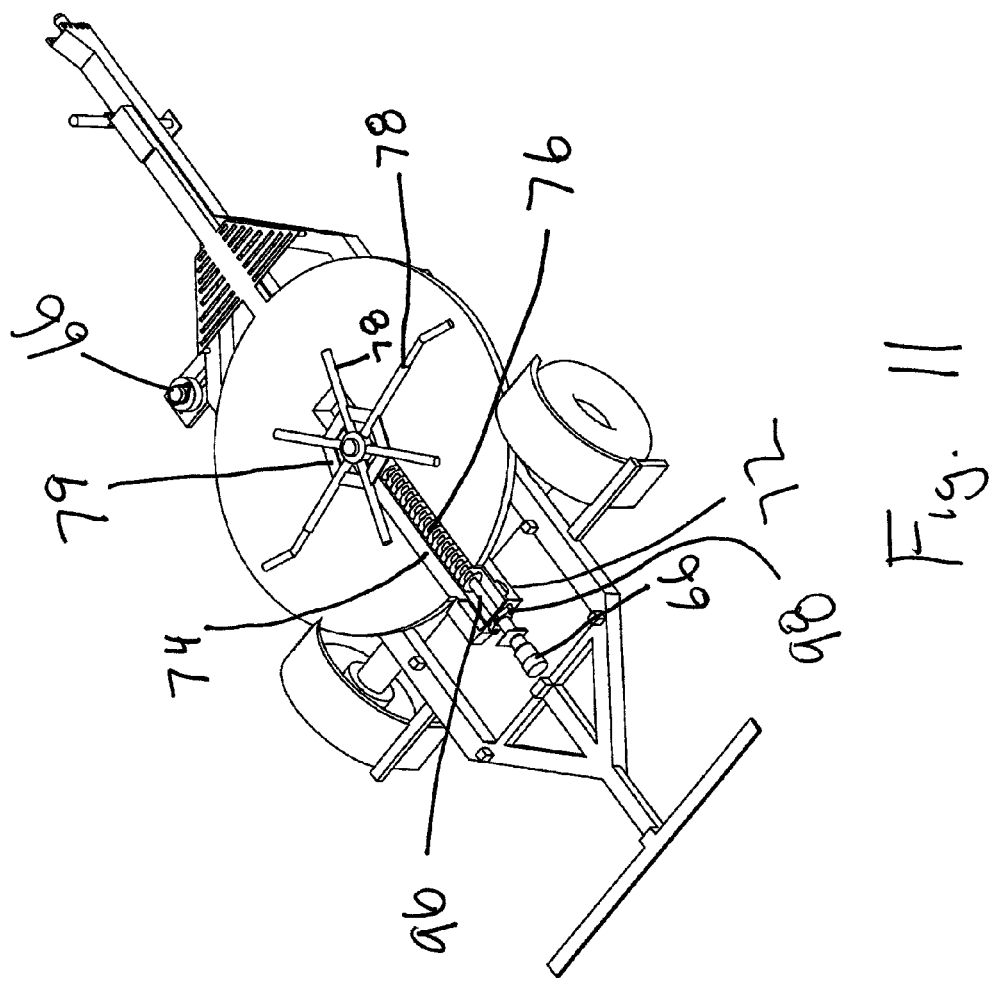
FIG. 11 is a cutaway perspective view of a material blower according to the present invention.
Figure 12:
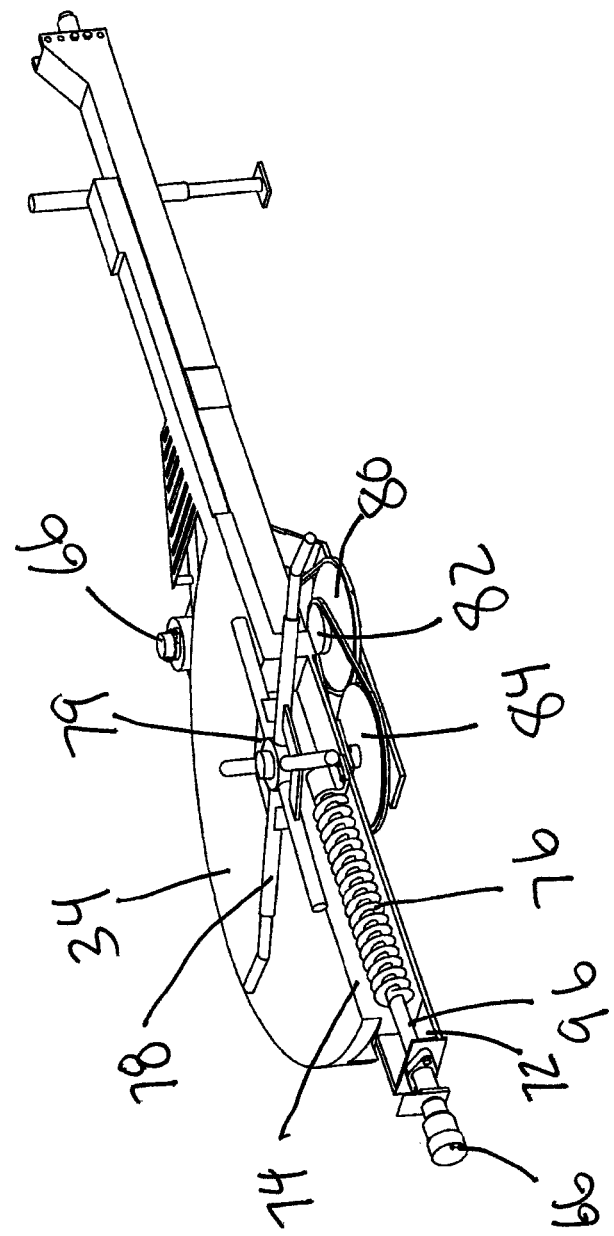
FIG. 12 is a cutaway perspective view of a material blower according to the present invention.
Figure 13:
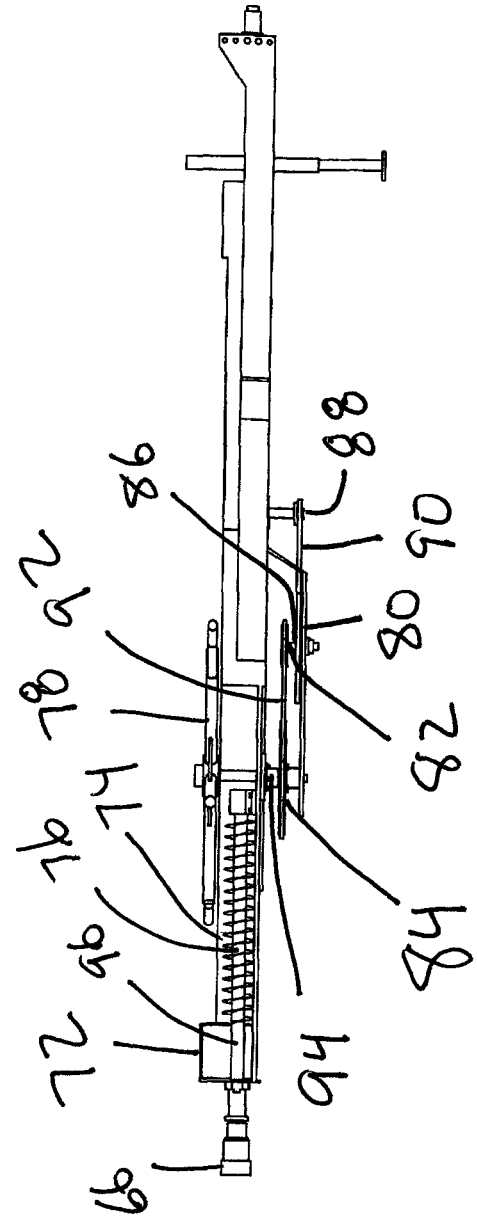
FIG. 13 is a cutaway side view of a material blower according to the present invention.
Figure 14:
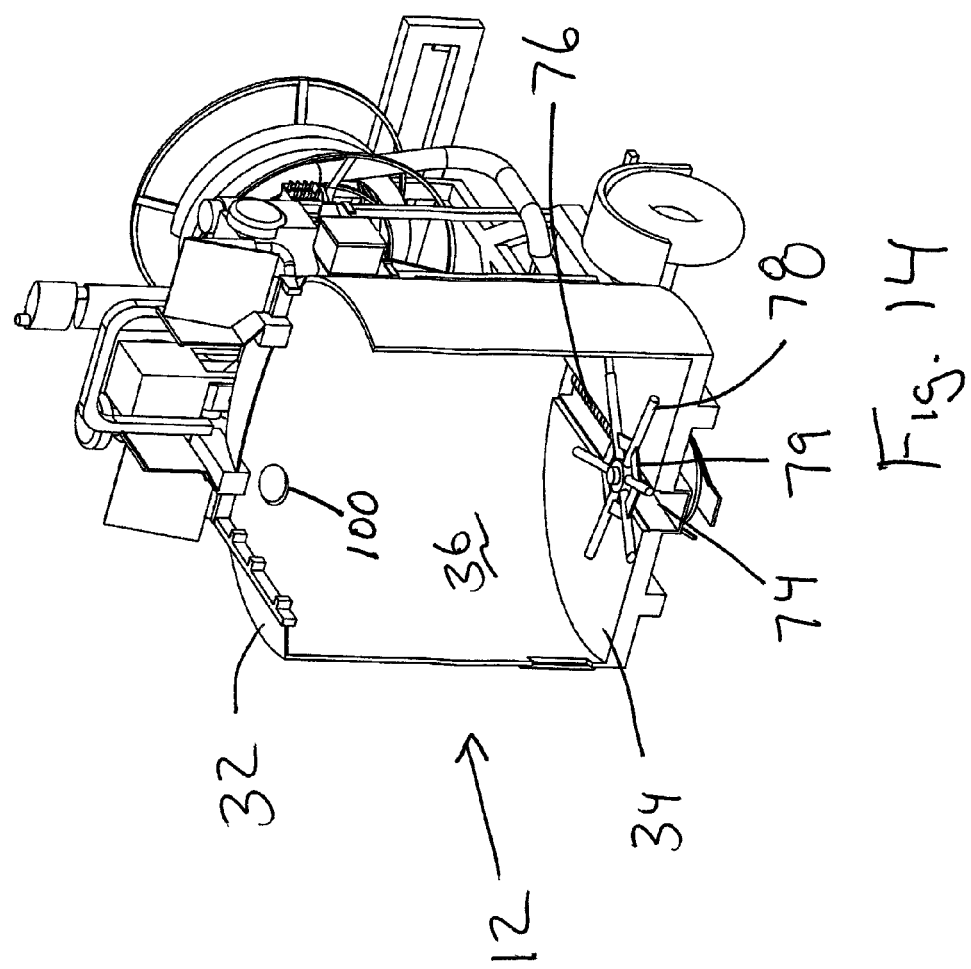
FIG. 14 is a cutaway perspective view of a material blower according to the present invention.

The dispensing unit 18 includes a distribution hose 68, hose reel 70, material exit box 72 and some internal container components inside the material container 12. The internal container components include a material output chute 74, an auger 76 and anti-clumping bars 78, as shown in FIGS. 10-14. The anti-clumping bars 78 are mounted to a rotating platform 79. Two of the bars 78 extend almost to the inside of the container wall 36, and the rest of the bars 78 are shorter. The material output chute 74 runs from the middle of the material container 12 to the material exit box 72 outside of the material container 12, as shown in FIGS. 11-13. The material output chute 74 is a sealed system between the material container 12 and the material exit box 72 to retain the airtight seal of the material container 12. The anti-clumping bars 78 rotate and push the material to the material output chute 74, so that the material falls into the material output chute 74. The material also falls into the material output chute 74 due to gravity and the weight of the material on top of the material near the material output chute 74. In the material output chute 74 is the auger 76 which rotates within the material output chute 74. The auger 76 is a mechanical movement device that helps to move the material to the material exit box 72. The auger 76 drives the material that falls into the material output chute 74 towards the material exit box 72 of the material container 12.

FIGS. 1, 3-6, and 8-12 show a hydraulic motor 66 mounted near the front of the trailer 10. The hydraulic motor 66 is connected to a gear reduction unit, as shown in FIGS. 8, 12-13, and 15. The gear reduction unit includes a first gear 80, second gear 82 and a third gear 84, as shown in FIG. 13. The first gear 80 includes a shaft 86 rotatably connected to framework of the gear reduction unit, such that the first gear 80 is retained to the framework, yet rotates freely. The first gear 80 is connected to a motor gear 88 of the hydraulic motor 66 by a chain 90, where rotation of the motor gear 88 causes rotation of the first gear 80. Acting as a mid gear, a second gear 82 is also attached to the shaft 88 of the first gear 80, such that rotation of the first gear 80 rotates the shaft 88 and the second gear 82. The second gear 82 is connected to the third gear 84 by a chain 92, where rotation of the second gear 82 causes rotation of the third gear 84. The third gear 84 is connected to framework of the gear reduction unit in a similar manner to the first gear 80 using a shaft 94. The shaft 94 of the third gear 84 is directly connected to the rotating platform 79 of the anti-clumping bars 78, where rotation of the third gear 84 causes the rotating platform 79 and hence the anti-clumping bars 78 to rotate. The chain drive and gears could be replaced by belts and pulleys or other transmission devices and methods.

Figure 16:
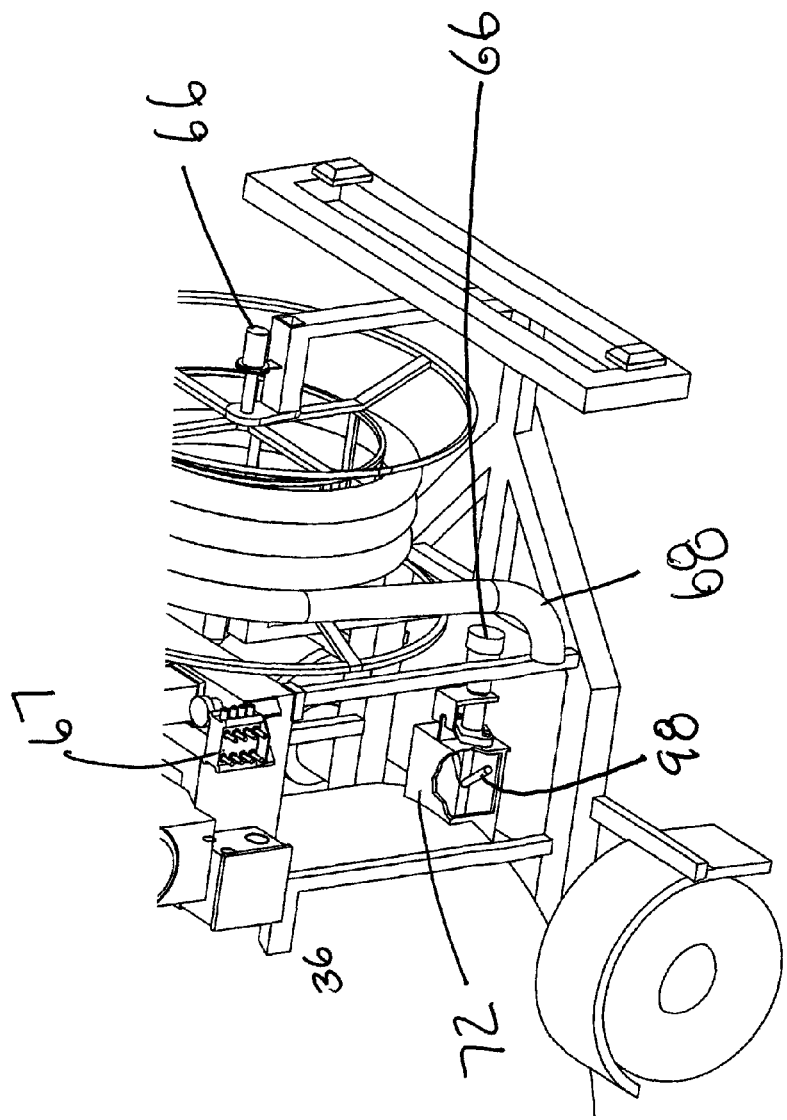
FIG. 16 is a partial perspective view of a material blower according to the present invention.

FIGS. 2, 8-13 and 16 show a hydraulic motor 66 connected to an auger shaft 96 extending from the auger 76. The shaft 96 of the auger 76 extends out from the material output chute 74 and through the material exit box 72 to connect to the hydraulic motor 66, as shown in FIG. 16. The hydraulic motor 66 rotates the auger shaft 96 and hence the auger 76 in the material output chute 74. The auger shaft 96 includes angled breakup bars 98, which rotate within the material exit box 72 during auger rotation by the hydraulic motor 66, a shown in FIG. 16. The breakup bars 98 prevent clumping of the material in the material exit box 72. Clumping is prevented using breakup bars 98 so that the material can be blown out of the material exit box 72 and into the distribution hose 68.

Figure 8:
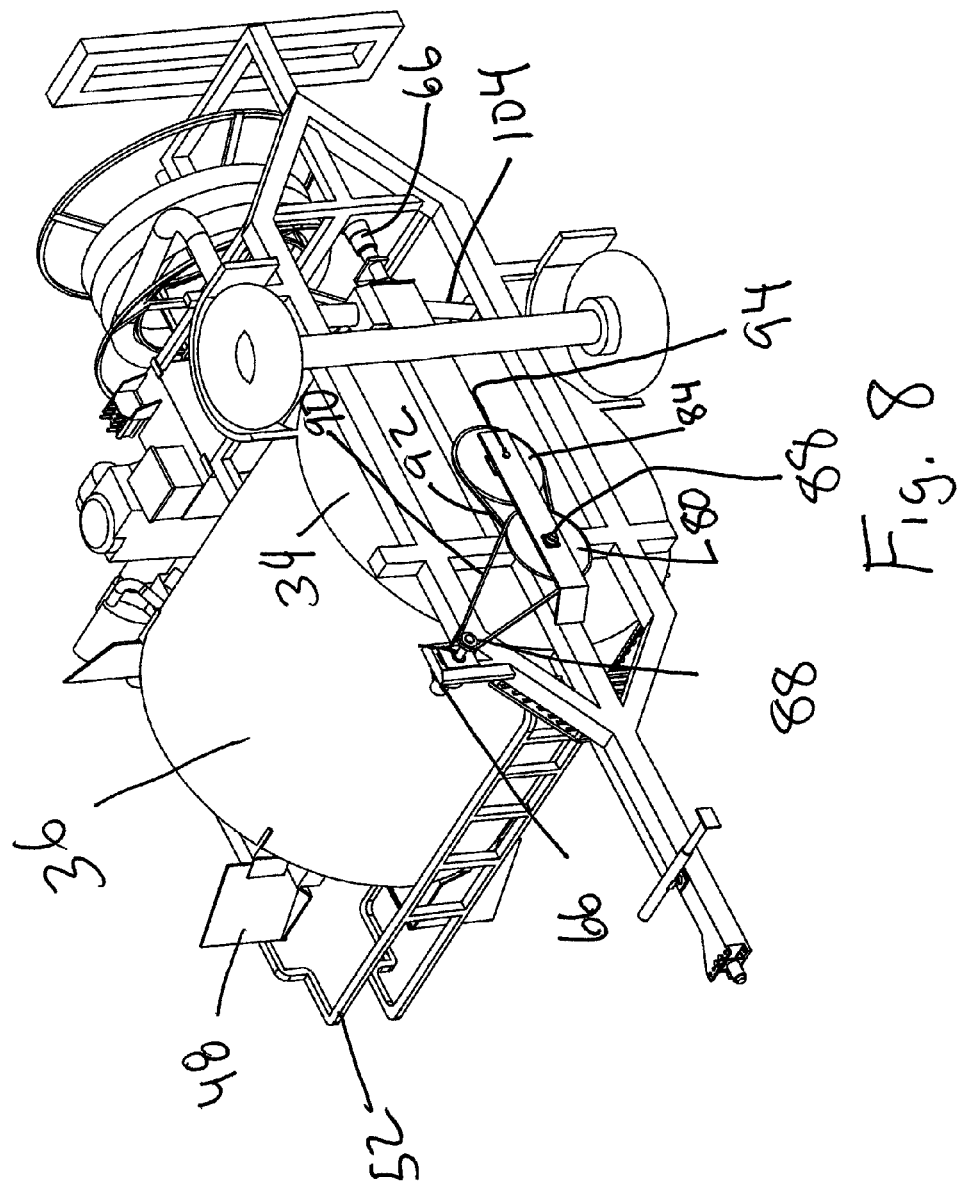
FIG. 8 is a perspective view of a material blower according to the present invention.
Figure 9:
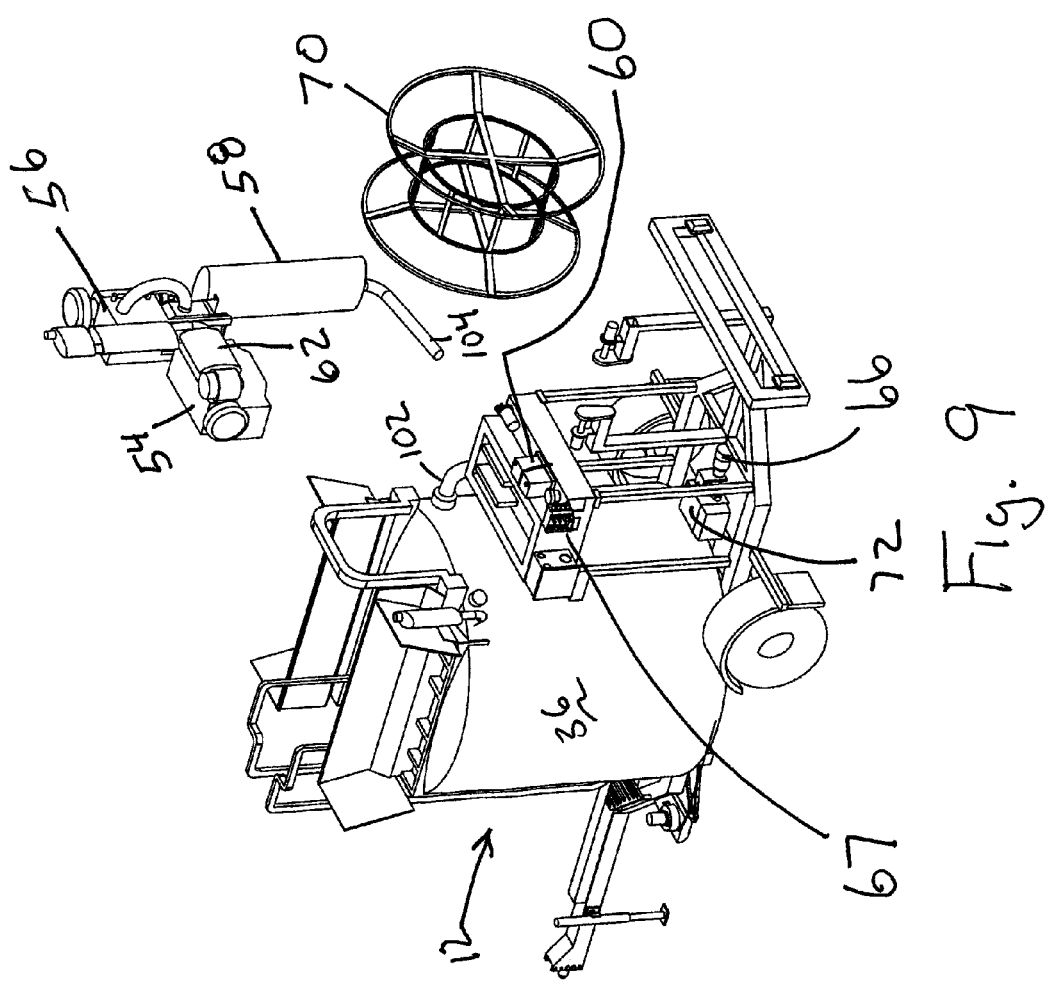
Figure 15:
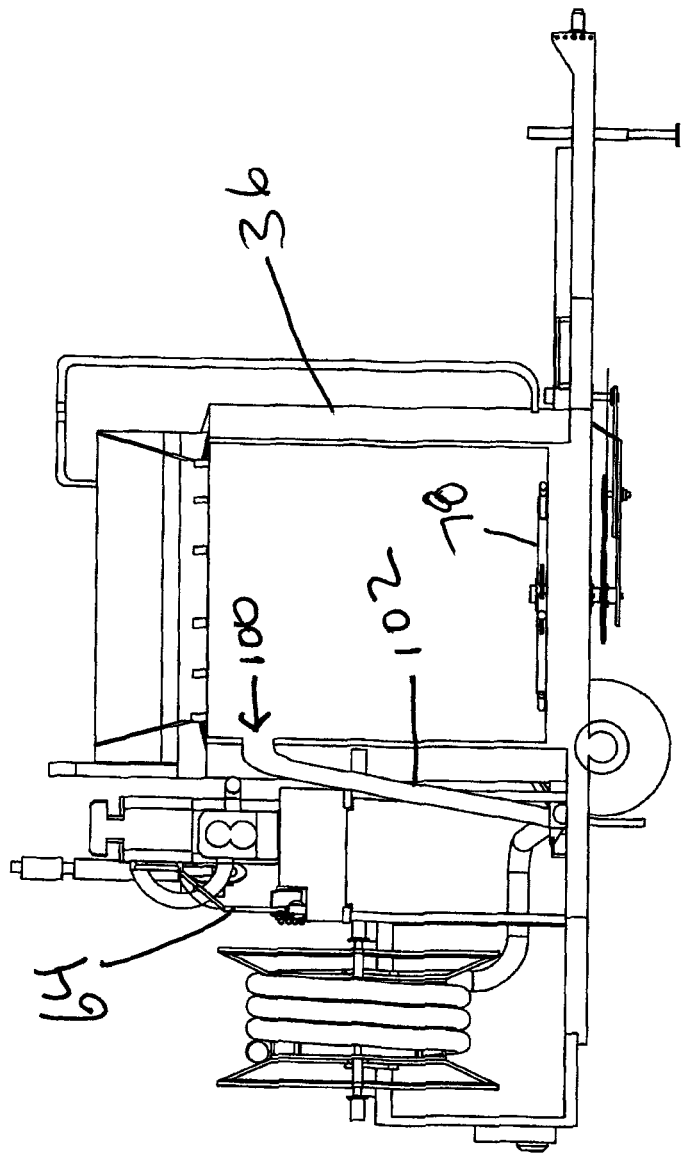
FIG. 15 is a cutaway side view of a material blower according to the present invention.

The output of the air blower 56 is directed through the air muffler 58. The exit of the air muffler 58 distributes the pressurized air stream from the air blower 56 to two locations. The air muffler 58 feeds the two locations a pressurized air stream that is produced by the air blower 56. The first location is an air inlet hole 100 into the container wall 36 near the top of the material container 12, as show in FIG. 14. An air pipe 102 is connected between the air muffler 58 and the air inlet hole 100, as shown in FIGS. 2 and 15. The air that is blown into the material container 12 from the air muffler 58 is used to pressurize the material container 12 and uses air to move the material into and along the material output chute 74. The second location that the pressurized air is delivered from the air muffler 58 is to the material exit box 72 using an air pipe 104, as shown in FIGS. 2 and 8. The air is forced into the material exit box 72 and then the air pushes the material from the material exit box 72 and into the distribution hose 68. The distribution hose 68 is connected to the material exit box 72 opposite of the connection for the entrance of the air from the air muffler 58, as shown in FIGS. 1, 4, 6, 8, 10. The material exit box 72 can be opened at the entrances of both the air pipe 104 and the distribution hose 68 that are connected to the material exit box 72, to allow cleaning of jammed material. The material is blown out of the material exit box 72 and thru the distribution hose 68 to the desired location to deposit the material. FIGS. 1-6, 8-10 and 14-16 show the distribution hose 68 wrapped around a hose reel 70. The distribution hose 68 is unrolled from the hose reel 70 for use in most cases. The distribution hose 68 can be used with some or all of the distribution hose 68 remaining on the hose reel 70. The hose reel 70 includes a hydraulic motor 66 that is used to rotate the hose reel 70 for winding and unwinding the distribution hose 68.

The operation of the material blower is as follows. The material container 12 is loaded by dumping material into the loading openings 38 when the sliding doors 40 are slid into the open position. As the material is loaded into the material container 12, it is broken up as it hits the break up bars 46 with the loading openings 38. After loading of the material, the sliding doors 40 are moved to cover the loading openings 38 and fastened down to provide an airtight seal. The material blower is than transported to the delivery location. The distribution hose 60 can be deployed from the hose reel 70 at arrival or at a later time. The power control unit 16 is used to start the power source 54 and the air blower 56 is engaged to pressurize the material container 12 and the rest of the material blower with air. Using the power control unit 16, the appropriate hydraulic valves are engaged to activate the hydraulic motor 66 that turns the rotating platform 79 and hence the anti-clumping bars 78 and to activate the hydraulic motor 66 that rotates the auger 76. Material then moves to the material exit box 72, where the pressurized air stream from the air muffler 58 pushes the material along the distribution hose 68 and out of the exit of the distribution hose 68.

It is envisioned that the hydraulic motors 64 could be replace by other types of device that would rotate the rotating platform 79 and the auger 76, which includes electrical motors. It is envisioned that there can be more than one material container 12 on the trailer 10, such that different materials could be separately delivered to the delivery location at the same time. The additional material containers could be run by the same power source and hydraulic motors or could have separate ones for each material container. There would be additional piping from the air blower 56 would be used to connect to additional material containers 12. It is envisioned the material blower could be mounted on a truck instead of a trailer.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof

I claim:

1. A material blower for blowing materials, comprising:
   a base:
   a material container to hold the materials during delivery of the materials to a destination, said material container mounted to said base, said material container including a top, bottom, a vertical axis of symmetry, and a container wall between and about said top and bottom to form a holding area for the materials, said top, bottom and container wall connected together and sealed such that the material container can be pressurized;
   at least one loading opening in said top of said material container to allow loading of the material, said loading opening having a door to cover and seal said at least one loading opening to allow said material container to be pressurized prior to distribution of the materials from said material container;
   a material exit as part of the material container to allow exit of the material, said material exit including a distribution hose opening and an air blower connection;
   an auger within said container and oriented from said axis to said wall to drive the material towards said material exit of said material container;
   at least one anti-clumping bar that rotates inside said material container on said bottom of said material container an oriented on said axis to breakup the material that has settled along said bottom during transport and deposit the material in said material exit;
   an air blower, said air blower connected to said material container near said top of said material container to blow air into said material container to pressurized said material container, said air blower connected to said material exit at said air blower connection to blow air into said material exit so as to blow the material out of said material exit;
   a distribution hose connected to said distribution hose opening of said material exit to receive and distribute the material that is blown out of said material exit by said air blower;
   a power unit connected to said mechanical movement device, said anti-clumping bars and said air blower, said power unit used to drive said mechanical movement device, said anti-clumping bars and said air blower.

2. The material blower of claim 1, further including a material output chute as part of said bottom of said material container to receive material for distribution, said material output chute open to inside of said material container and connected to said material exit; wherein said mechanical movement device is an auger within and along said material output chute, said auger rotatable positioned within said material output chute to drive the material that falls into said material output chute towards and out of said material exit of said material container; and wherein said at least one anti-clumping bar is above said material output chute to breakup the material and deposit the material in said material output chute.

3. The material blower of claim 2, wherein said material container is a cylinder shape.

4. The material blower of claim 2, wherein said base includes wheel and a hitch system such that said base acts as a trailer.

5. The material blower of claim 2, wherein each of said at least one loading opening includes loading shields about said at least one loading opening to prevent spillage of the material as it is loaded into said at least one loading opening.

6. The material blower of claim 2, wherein each of said at least one loading opening includes break up bars within said at least one loading openings to break up the material as it is loaded into said at least one loading opening.

7. The material blower of claim 2, wherein at least one of at least two of said anti-clumping bars reaches near said container wall.

8. The material blower of claim 2, further including a muffler that is between said air blower and said material container and that is also between said air blower and said material exit.

9. The material blower of claim 2, wherein said power is a diesel engine.

10. The material blower of claim 2, wherein said power is an electric motor engine.

11. The material blower of claim 2, wherein said auger is connected to a motor powered by said power unit, where said motor rotates said auger.

12. The material blower of claim 2, wherein said at least one anti-clumping bars is connected to a motor powered by said power unit, where said motor rotates said at least one anti-clumping bars about said bottom of said material container.

13. The material blower of claim 11, wherein said motor is a hydraulic motor drive driven by a hydraulic pump, said hydraulic pump being driven by said power unit.

14. The material blower of claim 12, wherein said motor is a hydraulic motor drive driven by a hydraulic pump, said hydraulic pump being driven by said power unit.

15. The material blower of claim 2, wherein said auger includes breakup bars in said material exit to prevent clumping of material in said material exit.

16. The material blower of claim 2, wherein each of said at least one loading opening includes loading shields about said at least one loading opening to prevent spillage of the material as it is loaded into said at least one loading opening; wherein each of said at least one loading opening includes break up bars within said at least one loading openings to break up the material as it is loaded into said at least one loading opening.

17. The material blower of claim 16, wherein at least one of at least two of said anti-clumping bars reaches near said container wall.

18. The material blower of claim 2, wherein said material output chute is at least half a length of said bottom of said material container.

19. The material blower of claim 16, wherein said auger is connected to a motor powered by said power unit, where said motor rotates said auger and wherein said at least one anti-clumping bars is connected to a motor powered by said power unit, where said motor rotates said at least one anti-clumping bars about said bottom of said material container.

20. The material blower of claim 16, wherein said auger includes breakup bars in said material exit to prevent clumping of material in said material exit.

* * * * *